United States Patent [19]

Atsugi et al.

[11] Patent Number: 4,561,099
[45] Date of Patent: Dec. 24, 1985

[54] CLOCK RECOVERY SYSTEM FOR TDMA SATELLITE COMMUNICATION SYSTEM

[75] Inventors: Takeo Atsugi; Shuuichi Samejima; Tatsurou Masamura, all of Kanagawa, Japan

[73] Assignee: Nippon Telegraph & Telephone Public Corporation, Tokyo, Japan

[21] Appl. No.: 557,675

[22] Filed: Dec. 2, 1983

[30] Foreign Application Priority Data

Dec. 2, 1982 [JP] Japan .................. 57-210599
Nov. 18, 1983 [JP] Japan .................. 58-215939

[51] Int. Cl.[4] .................. H04L 27/06; H04L 7/00
[52] U.S. Cl. .................. 375/97; 375/106; 370/104
[58] Field of Search .................. 375/97, 106, 108, 113; 371/40, 42, 45, 46; 370/100, 104, 105; 364/575, 734

[56] References Cited

U.S. PATENT DOCUMENTS 3,641,274 2/1972 Sasaki et al. .................. 370/104
4,054,753 10/1977 Kaul et al. .................. 370/104
4,232,197 11/1980 Acampora et al. .................. 370/104
4,339,824 7/1982 Tanimoto .................. 370/104

Primary Examiner—Robert L. Griffin
Assistant Examiner—Stephen Chin
Attorney, Agent, or Firm—Armstrong, Nikaido, Marmelstein & Kubovcik

[57] ABSTRACT

A clock signal in a TDMA burst signal is recovered by using the frequency and phase information extracted by taking a moving average of plural bursts received previously from the same earth station. The system has memory storage for storing frequency and/or phase information of a moving average of plural bursts received previously, and clock signal necessary to demodulate the present burst is recovered by using output of the memory storage. Thus, the synchronized clock signal for demodulating the received burst is obtained in a short time, or even a clock recovery bits in a burst may be removed. The establishment of the synchronized clock signal is indicated by a synchronization circuit which provides the establishment signal for each burst after receiving a predetermined plurality of bursts from the same earth station.

6 Claims, 19 Drawing Figures

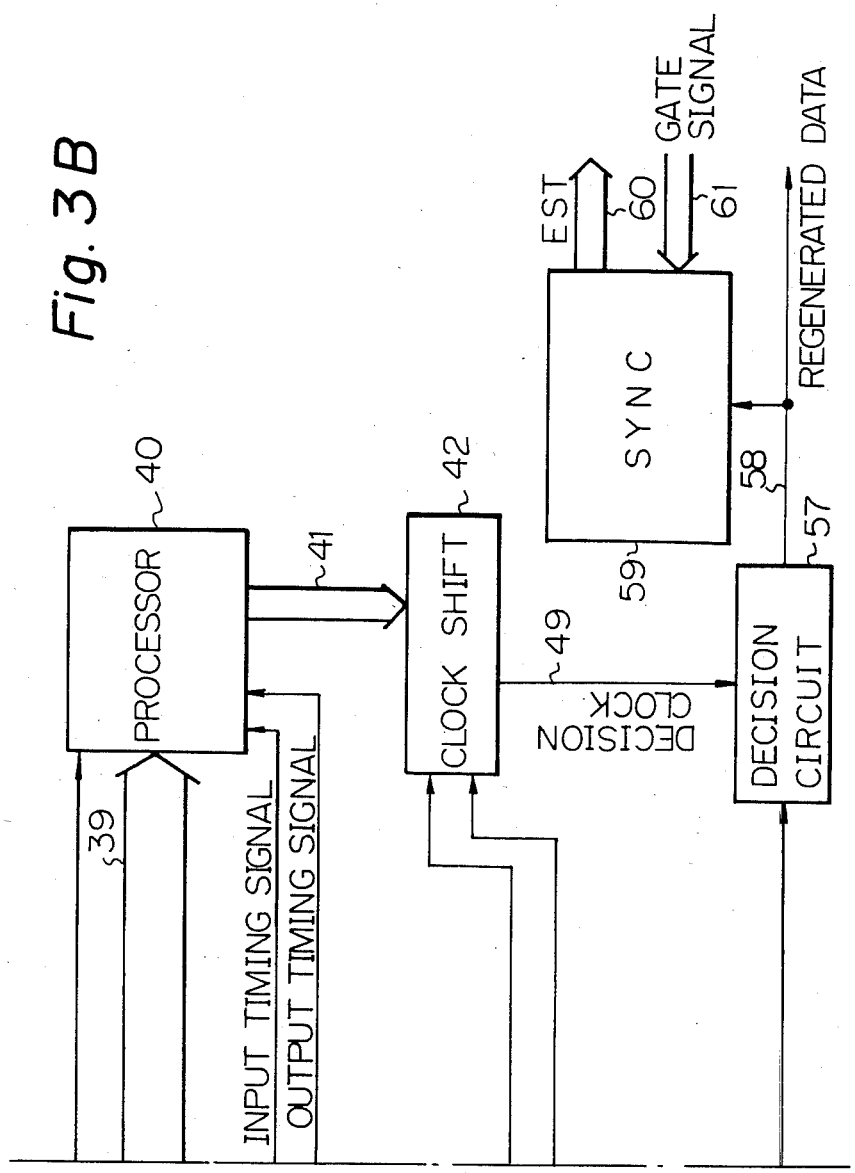

| Fig.5A | Fig.5B |

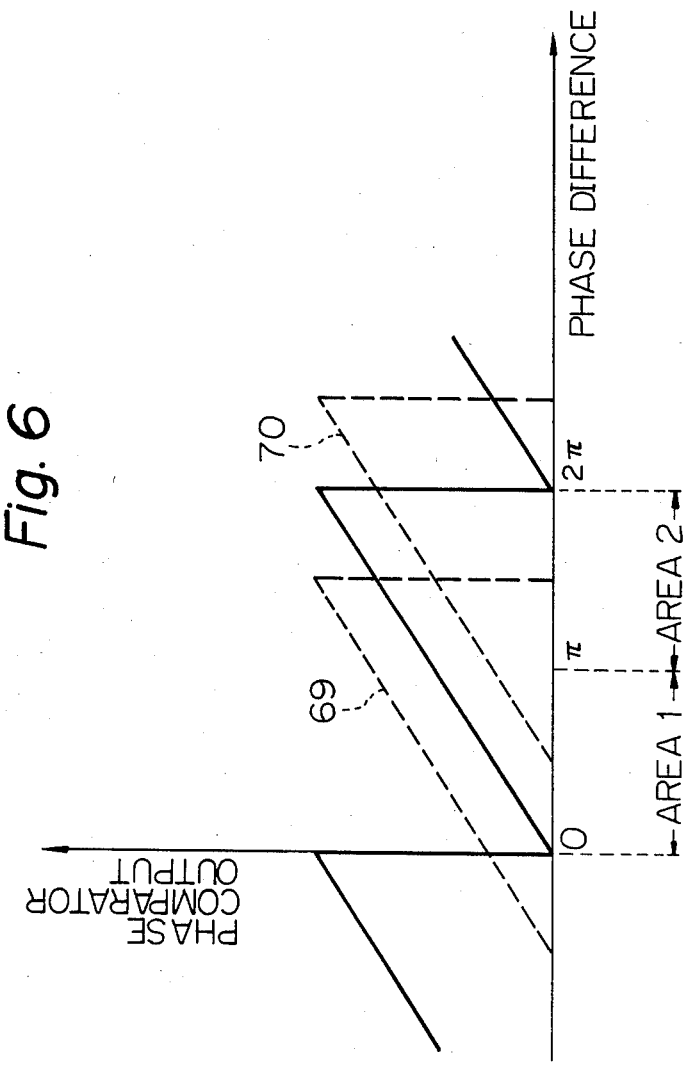

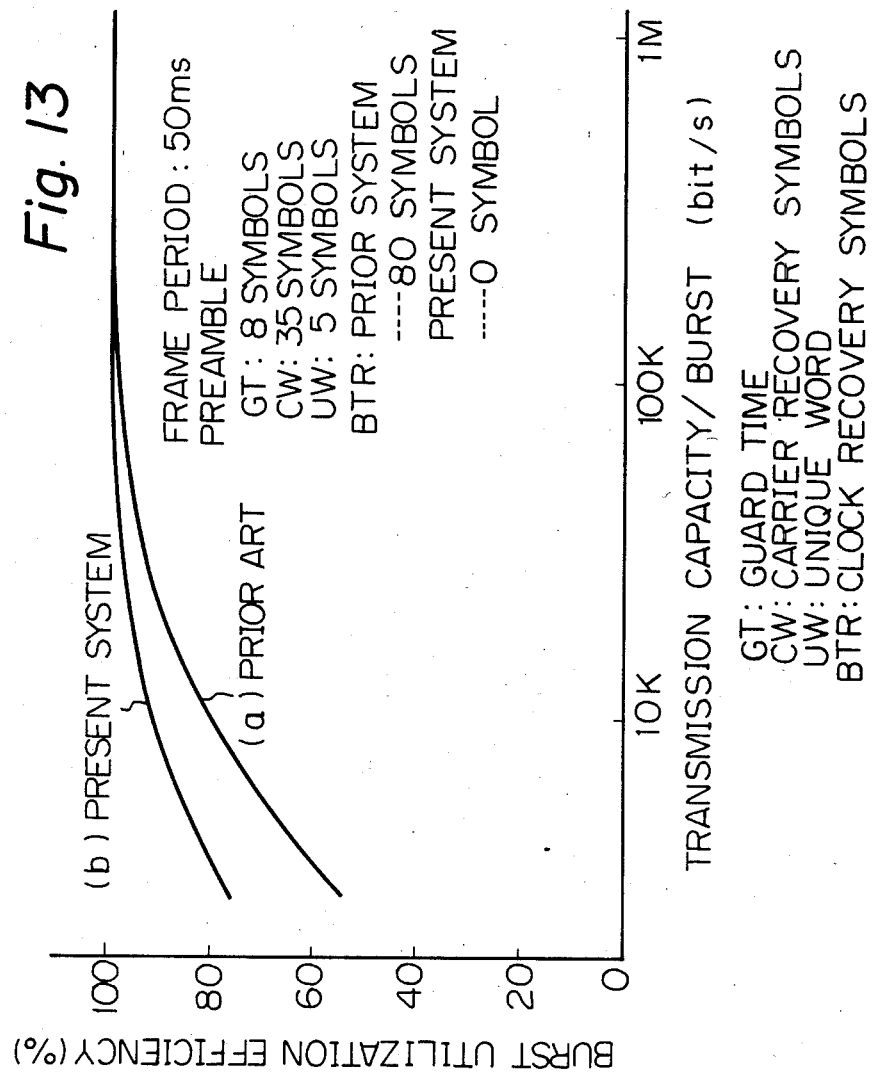

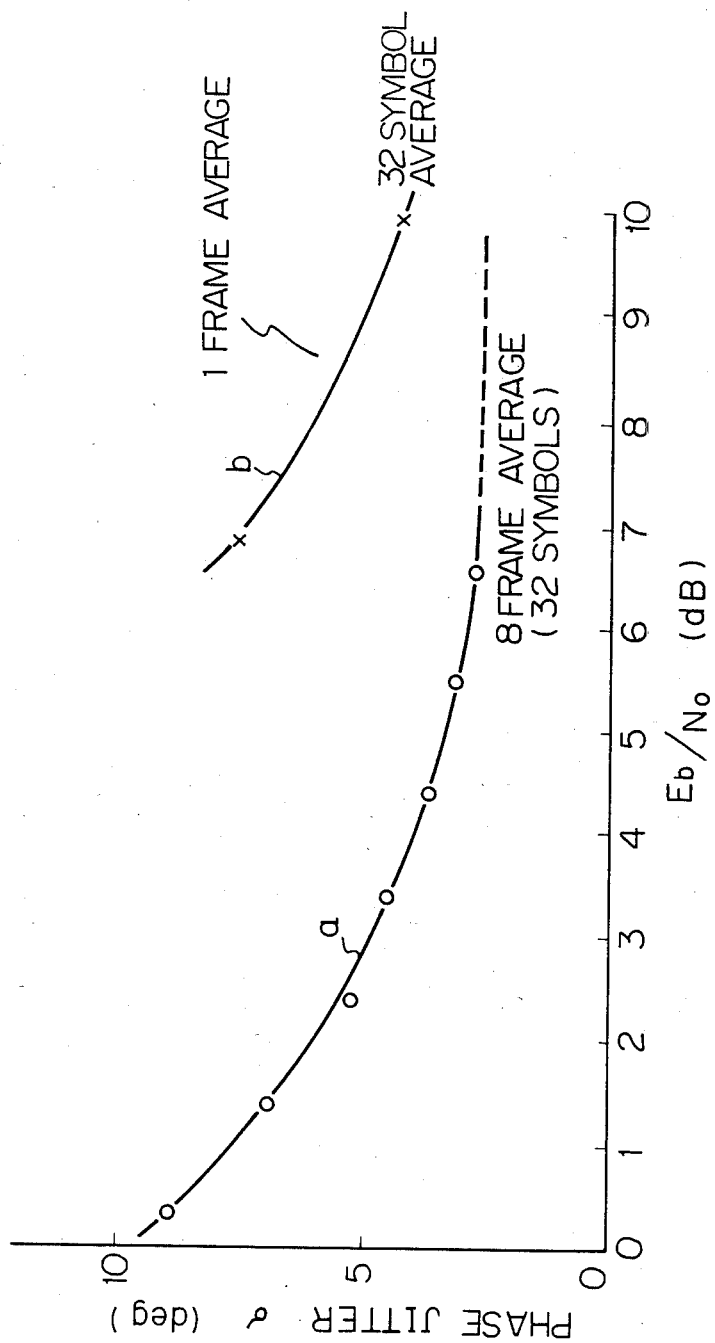

CLOCK RECOVERY SYSTEM FOR TDMA SATELLITE COMMUNICATION SYSTEM

BACKGROUND OF THE INVENTION

The present invention relates to a clock recovery system for a TDMA (time division multiple access) satellite communication system. The present system is used at the receiving side of a satellite communication system.

In a TDMA system, a digital signal in bursts is transmitted periodically at a predetermined interval. At the receiving side, a clock signal for demodulating data must be recovered by using the information contained in the received burst itself.

Conventionally, that clock signal has been recovered in each related burst. That is to say, a clock signal for demodulating data of a burst is recovered by using said burst itself.

FIG. 1 shows a prior frame structure, in which the symbols (a), (b), (c) and (n) are bursts, and $a_1$ through $a_5$ shows the detail of each burst. The symbol $a_1$ indicates guard time, $a_2$ indicates carrier recovery symbols, $a_3$ indicates clock recovery symbols usually has a pattern of alternating 1 and 0, $a_4$ indicates UW (unique word), and $a_5$ indicates data to be transmitted. The carrier recovery symbols $a_2$ usually includes 40 symbols, and the clock recovery symbols $a_3$ usually includes 80-150 symbols for establishing the synchronized clock signal with small phase error.

The disadvantage of a prior clock signal recovery system is that the clock signal $a_3$ in a burst occupies a substantial time ratio in a burst. Since the necessary number of pulses of clock signal is fixed to 80-150 regardless of TDMA bit rate, that ratio is high in particular when the burst length is short, and the transmission speed is low, and the high ratio of clock recovery symbols in a burst decreases the transmission efficiency in a TDMA system.

SUMMARY OF THE INVENTION

It is an object, therefore, of the present invention to overcome the disadvantages and limitations of a prior clock signal recovery system by providing a new and improved clock signal recovery system for a TDMA communication system.

It is also the object of the present invention to provide a clock signal recovery system for a TDMA satellite communication system in which a clock signal in a burst is reproduced with a small number of clock recovery symbols or clock recovery symbols in a burst even being deleted, and the transmission efficiency is increased.

A further objective of the present invention is to provide such a system which has indication signal of establishment of clock synchronization.

Still further object of the present invention is to provide such a system which improves substantially the value of S/N (signal to noise ratio) of the recovered clock signal.

The above and other objects are attained by a clock signal recovery system for a TDMA satellite communication system in which a transmitting earth station transmits periodically modulated burst signals which are synchronized with each other in both frequency and phase and a receiving earth station demodulates that burst signal by using the recovered clock signal comprising; an input terminal for receiving TDMA burst signals; a burst clock recovery means to obtain burst clock from the received burst signals; a clock control mean to generate the recovered clock by controlling the local clock oscillator according to the stored frequency and/or phase information and said burst clock; a frequency and/or phase memory storing frequency and/or phase information of output of said burst clock recovery means for a plurality of frame periods and providing signal of average of those frequency and/or phase information; a decision circuit for regenerating received burst signal by using the recovered clock signal; a first output terminal coupled with output of said decision circuit to provide regenerated burst signal; a synchronization detection circuit coupled with said output terminal for indicating establishment of clock synchronization of a clock signal after receiving predetermined plurality of bursts from the same transmitting earth station; a second output terminal coupled with output of said synchronization detection circuit.

BRIEF DESCRIPTION OF THE DRAWINGS

The foregoing and other objects, features, and attendant advantages of the present invention will be appreciated as the same becomes better understood by means of the following description and accompanying drawings wherein;

FIG. 6 is the phase comparison characteristics, FIG. 13 shows curves of the improvement in transmission efficiency by the present invention, and FIG. 14 shows the experimental curves of the recovered clock jitter improvement by the present invention.

DESCRIPTION OF THE PREFERRED EMBODIMENTS

Figure 1:
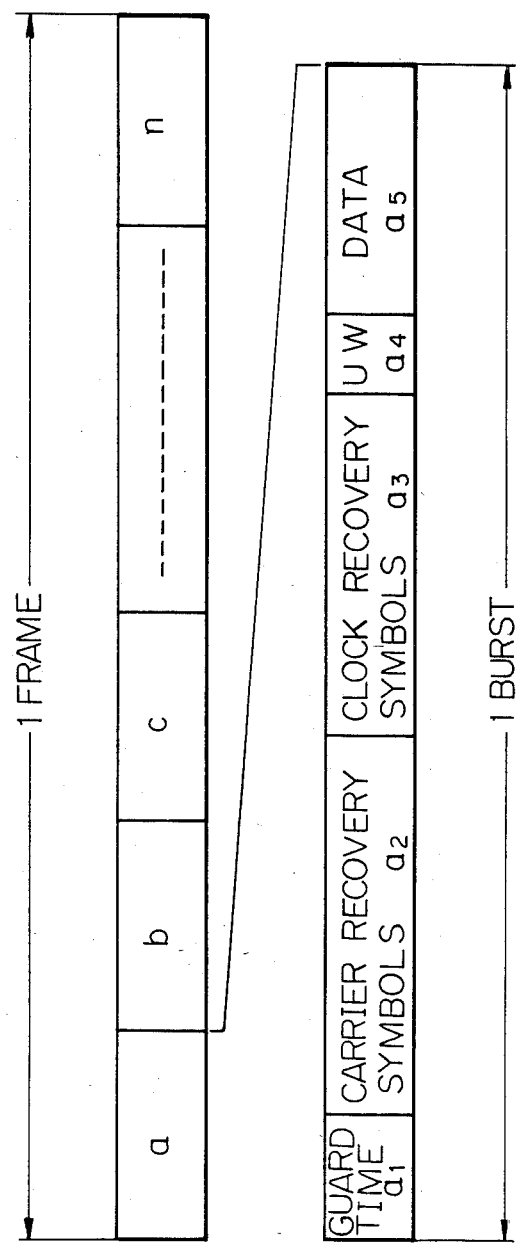
FIG. 1 shows the structure of a frame in TDMA communication in a prior art.
Figure 2A:
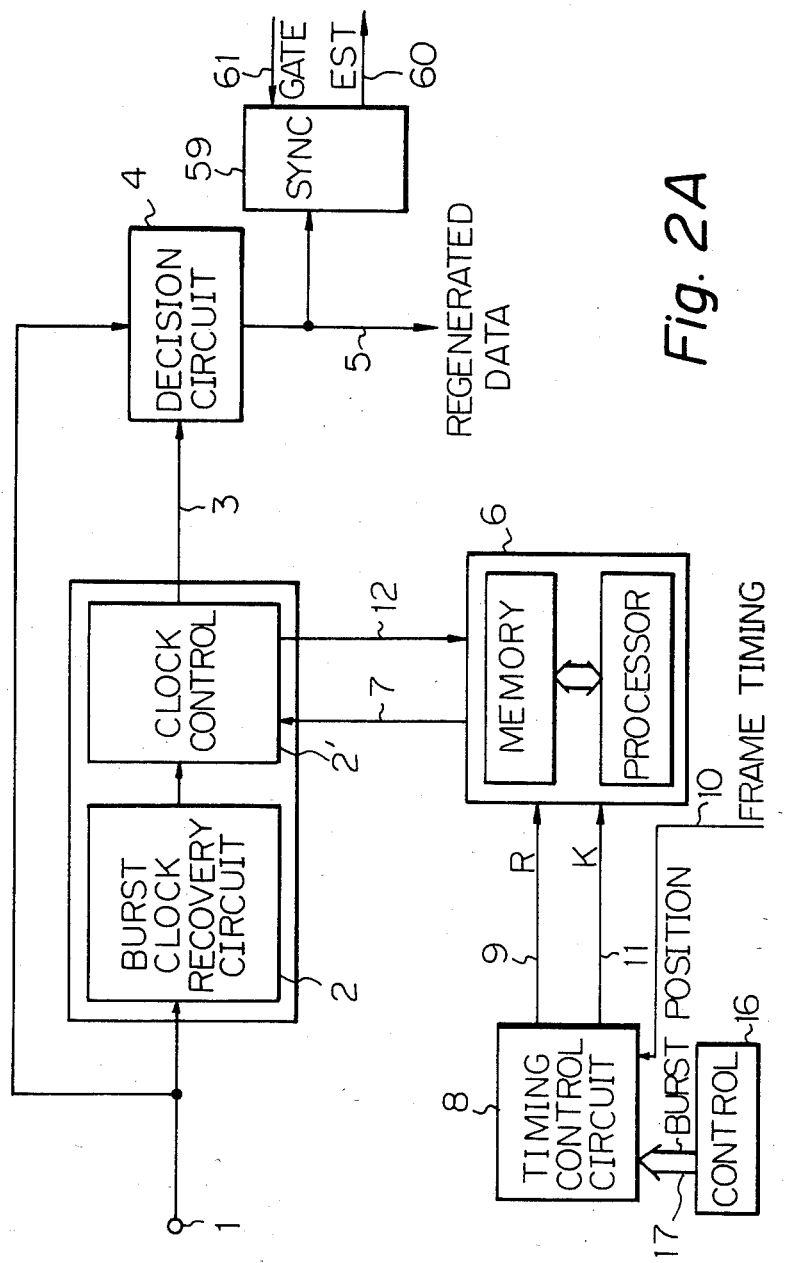
FIG. 2A is a block diagram of the embodiment of the clock recovery system according to the present invention.

FIG. 2A shows a block diagram of the clock signal recovery system according to the present invention. In the figure, the reference numeral 1 is an input terminal for receiving a TDMA burst, 2 is a burst clock recovery circuit for obtaining the burst clock signal, 2' is a clock control circuit implemented by a phase lock loop (PLL), 3 is a recovered clock signal, 4 is a decision circuit, 5 is a regenerated data, 6 is a frequency and/or phase information memory, 7 is the frequency and/or phase information for recovering a clock signal, 8 is a timing control circuit, 9 is a read control signal, 10 is a frame timing signal for providing a frame timing, 11 is a control signal for holding frequency and/or phase information, 12 is a frequency and/or phase information extracted from a receiving burst signal, 16 is a control circuit, and 17 is a burst position signal for indicating which burst is to be regenerated.

It is assumed in the present invention that the transmission clock frequency is so accurate that the frequency difference between clock signals of neighboring frames is almost zero. Therefore the clock frequency and phase of the bursts in neighboring frames transmitted by a particular transmitter is almost coherent sith each other.

The burst clock recovery circuit 2 which is implemented by a tank limiter, provides a burst clock signal after extracting the clock component from the input signal. The clock control circuit 2' which is implemented by a phase lock loop, provides the recovered clock signal. The recovered clock signal 3 is provided to the decision circuit 4. The extracted frequency and-/or phase information 12 is stored the frequency and/or phase information memory 6, which stores said information in the memory upon the control signal 11.

It should be noted that the clock frequency depends upon each burst since TDMA burst signals are sent from various transmitting earth stations which operate independently from each other. Circuit 6 stores the frequency and/or phase information of the clock signal for each transmitting earth station, calculates average of the frequency and/or phase information over previous plural frames and provides the information to circuit 2' under control of the read control signal 9. The timing control circuit 8 receives the frame timing signal 10 which indicates the location of a frame, and the burst position signal 17 which indicates the location of a burst in a frame, and according to those signals circuit 8 generates the receive timing signal which indicates the beginning position of a burst. Said receive timing signal is applied to circuit 6 as the read control signal 9 which is used to read the frequency and/or phase information in circuit 6 relating to the burst, then, the frequency and/or phase information thus read is applied to circuit 2' through line 7 as the initial frequency and/or phase value for operating the PLL circuit 2'. As the frequency and/or phase information on line 7 is derived from previously received bursts from the same transmitting earth station, and the previous frequency and/or phase is almost the same as that of the present burst, the PLL circuit 2' is phase-locked in a very short time compared with a prior circuit. The obtained recovered clock signal 3 is then used for regenerating the received burst signal. The decision circuit 4 regenerates the received burst signal by effecting a logical product of the received burst signal and the recovered clock signal to produce the regenerated data 5. The synchronization detection circuit 59 provides information 60 which indicates the establishment of the clock signal after receiving a predetermined plurality of bursts or unique words.

Figure 2B:
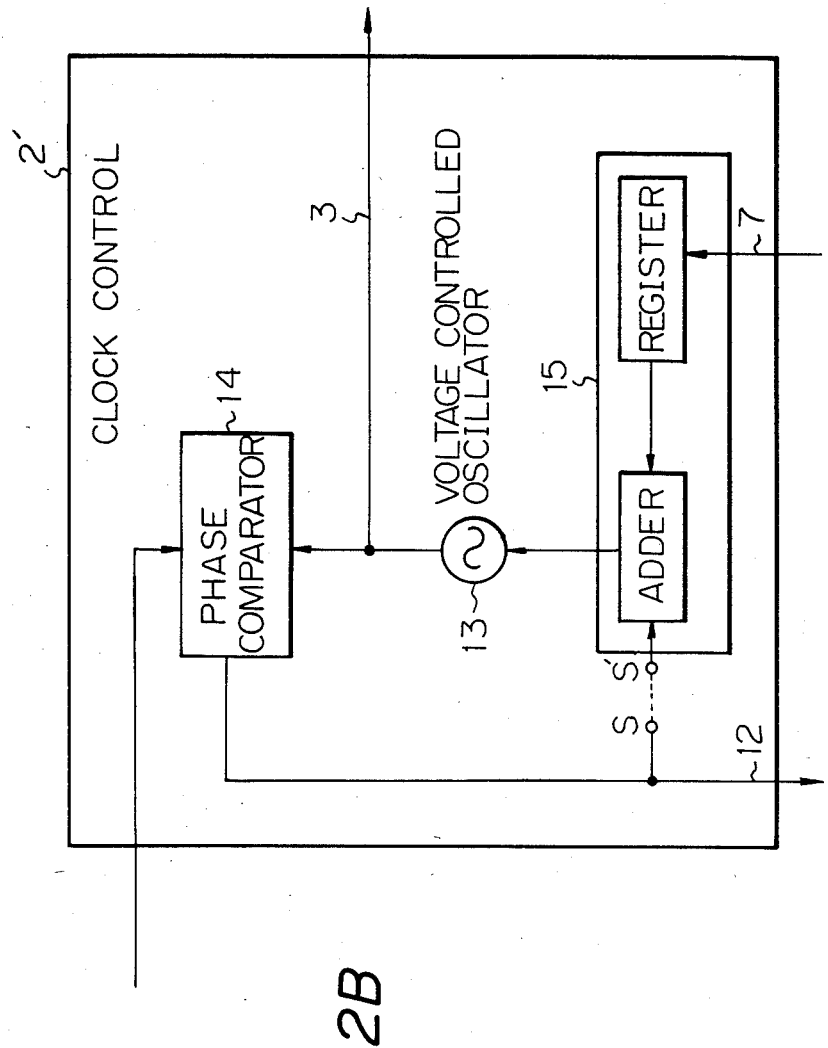
FIG. 2B is a block diagram of the embodiment of the clock control circuit in FIG. 2A according to the present invention.

FIG. 2B shows the clock control circuit of FIG. 2A. The clock control circuit comprises a voltage-controlled-oscillator (VCO) 13, a phase comparator 14 and a input circuit 15 to receive the frequency and/or phase information 7 from circuit 6.

When there are clock recovery symbols, the said information is applied to the VCO 13 before receiving the clock recovery symbols and output 12 of the phase comparator 14 is fed back to the VCO 13 through the connection (S—S').

In this case the recovered clock signal 3 is determined by both the previous bursts and the present burst.

On the other hand, when clock recovery symbols are completely removed, the said information is applied to the VCO 13, but the output 12 of the phase comparator 14 is not fed back to the VCO 13, thus there is no direct connection between the phase comparator 14 and the VCO 13. In this case, the recovered clock signal 3 is determnined only by the previous bursts. By taking the moving average of plural frames, the jitter of the recovered clock signal can be reduced significantly.

Figure 2C:
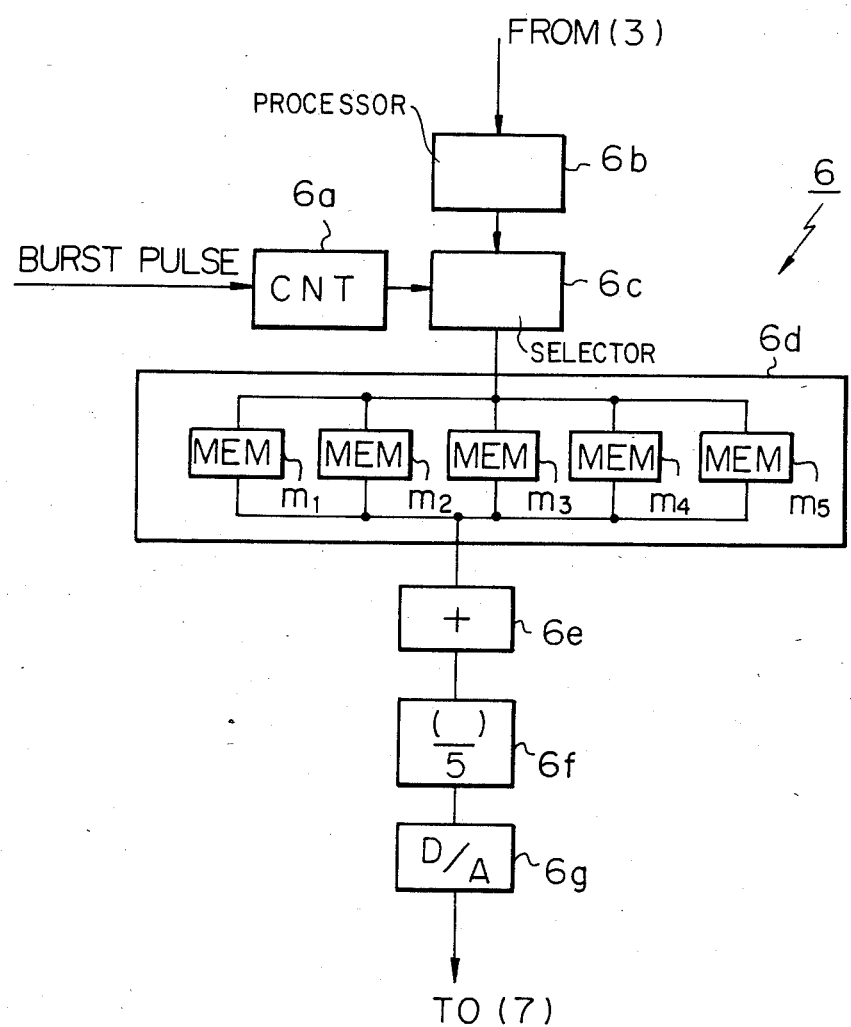
FIG. 2C is a block diagram of the frequency and/or phase information memory 6 in FIG. 2A, FIGS. 3A and 3B are block diagram of the still another embodiment of the clock recovery system according to the present invention.

FIG. 2C shows an example of the block diagram of the frequency and/or phase information memory 6. The memory functions to provide the frequency and/or phase information of the clock signals averaged over preceding plural bursts. In FIG. 2C, circuit 6b is a processor which provides the output digital signal indicating the clock frequency and/or phase information averaged with in a burst. The output of circuit 6b is distributed to the memories $m_1$ through $m_5$ by selector 6c which is cyclically switched by the output of counter 6a which is incremented by the frequency holding signal 11 of FIG. 2A. The memory 6d has a plurality of cells $m_1$ through $m_5$ for storing frequency and/or phase information of preceeding several bursts. The adder 6e provides the sum of the outputs of the memory cells $m_1$ through $m_5$. The divider 6f provides the average of the outputs of the memory cells $m_1$ through $m_5$ by dividing the sum by the total number (5 in the present embodiment) of the memory cells, and a digital-to-analog converter 6g provides the voltage corresponding to the output of circuit 6f. The output of circuit 6g is provided to the clock control circuit 2' of FIG. 2A for controlling the PLL loop. In FIG. 2C, memory 6d is read out every time the read control signal 9 (see FIG. 2A) is provided to the circuit of FIG. 2C.

It should be appreciated in the embodiment of FIGS. 2A that the present invention has the features that the recovered clock signal is provided based upon the previous bursts and the present burst or merely upon the previous bursts, and that a plurality of previous bursts effect to recover the clock to regenerate the present burst. In a prior art, the previous bursts do not affect the present recovered clock frequency and/or phase, but the clock signal is recovered merely by the present burst.

Figures 3, 3A:
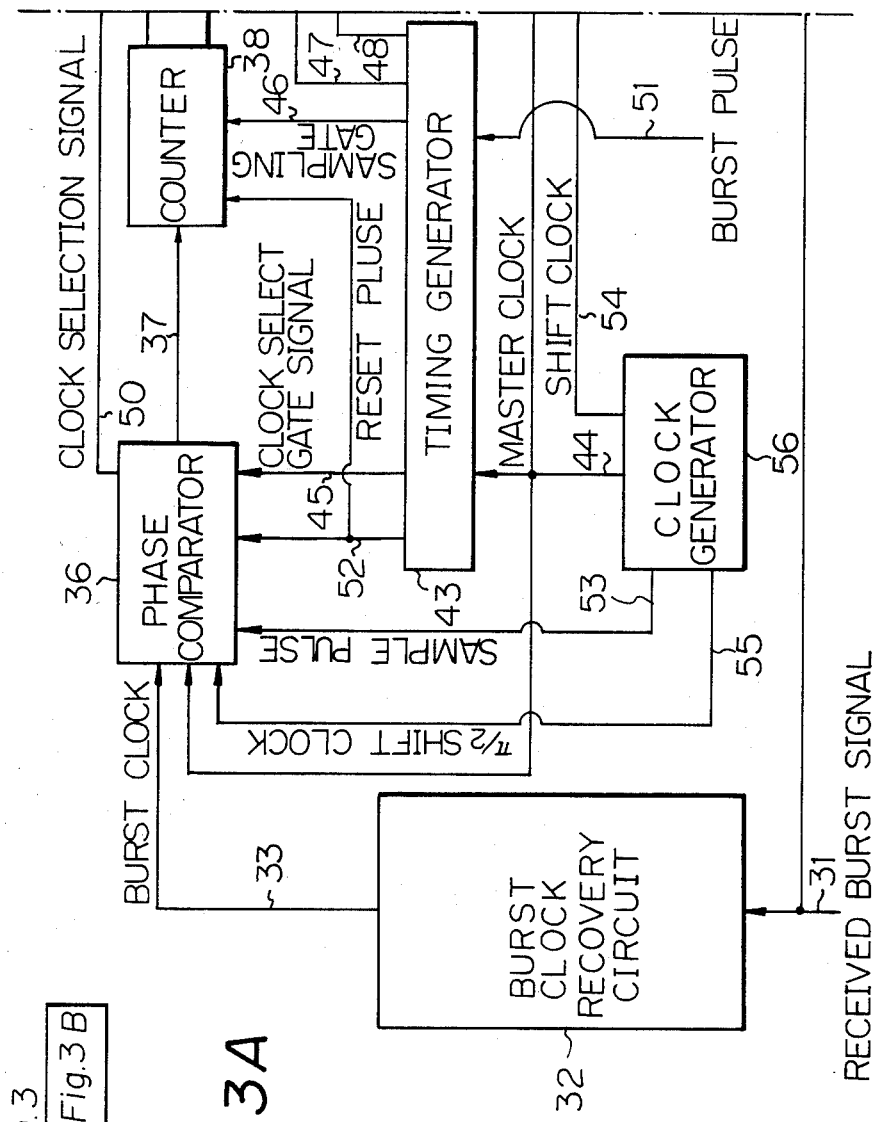

FIG. 3 is the block diagram of another embodiment according to the present invention.

In FIG. 3, the numeral 31 is a received burst signal, 32 is a burst clock recovery circuit for deriving burst clock from the received burst signal 31, 33 is the burst clock, 36 is a phase comparator for comparing the phase of the burst clock signal with the master clock signal, 37 is the output of the phase comparator 36, 38 is a counter, 39 is the output of the counter 38, 40 is a processor, 41 is the signal indicating the clock phase difference information of the received burst signal 31, 42 is a clock shifter, 43 is a timing generator, 44 is a master clock, 45 is a clock select gate signal, 46 is a sampling gate signal, 47 is an input timing signal, 48 is an output timing signal, 49 is a decision clock signal, 50 is a clock selection signal, 51 is a burst pulse indicating the start of the burst, 52 is a reset pulse, 53 is a sample pulse, 54 is a shift clock, 55 is a $\pi/2$ shift clock, 56 is a clock generator, 57 is a decision circuit, 58 is a regenerated data, 59 is a clock synchronization detection circuit, 60 is a clock synchronization establishment indication signal and 61 is a gate signal.

The burst clock recovery circuit 32 derives the burst clock 33 from the received burst signal. The phase of the burst clock 33 is compared with the phase of the master clock 44 by the phase comparator 36. That comparison is accomplished at the latter half portion of the received burst signal 31, where the output of the burst clock recovery circuit 32 is well established. The output 37 of the phase comparator 36 is a burst sampling signal which is obtained by gating the high speed sample pulse 53 in the phase comparator 36, and said burst sampling pulses 37 is counted by the counter 38. Since that sampling is carried out for plural clock pulses in the latter half portion of the received burst signal 31, the output 39 of the counter 38 is the sum of the phase difference of those plural clock pulses. THe processor 40 receives the output 39 according to the input timing signal 47, gives the output 39 the necessary treatment described later on, obtains the average phase difference of the recovered burst clock 33 with respect to the master clock and stores said average phase difference as the phase difference information A of the received burst signal 31.

Said operation is carried out for a plurality of burst signals which are transmitted from the same earth stations as that of the received burst signal 31, and each clock phase difference information A for each burst is stored in the memory. The capacity of that memory is predetermined, and therefore, the new information substitutes the oldest informaion in the memory. Thus, the memory can store the latest phase difference information A.

The decision clock for regenerating the received burst signals is obtained as a clock whose phase is the average (phase difference information B) of the predetermined number of phase information A. Accordingly, it should be noted that said phase difference information B depends upon a plurality of previous bursts which have been transmitted by a particular earth station, and said information B is read out as the clock phase difference information signal 41 from the processor 40 according to the output timing signal 48 which is provided by the timing generator 43. Said clock phase difference information signal 41 is applied to the clock shifter 42, which shifts the master clock 44 by the high speed shift clock 54, and the clock signal with proper phase with respect to the master clock is selected according to the information 41. The clock signal which has the selected phase with respect to the master clock 44 is applied to the decision circuit 57 as the decision clock 49, and the received burst signal 31 is regenerated by using that decision clock 49.

The establishment of the clock signal synchronization is indicated by the clock synchronization detection circuit 59 which provides the clock synchronization establishment signal 60 after detecting a predetermined plurality of bursts or unique words. After the establishment of the clock synchronization, the regenerated data 58 can be applied to an external circuit as the received signal.

Now, each block in FIG. 3 is described in detail.

Figure 4A:
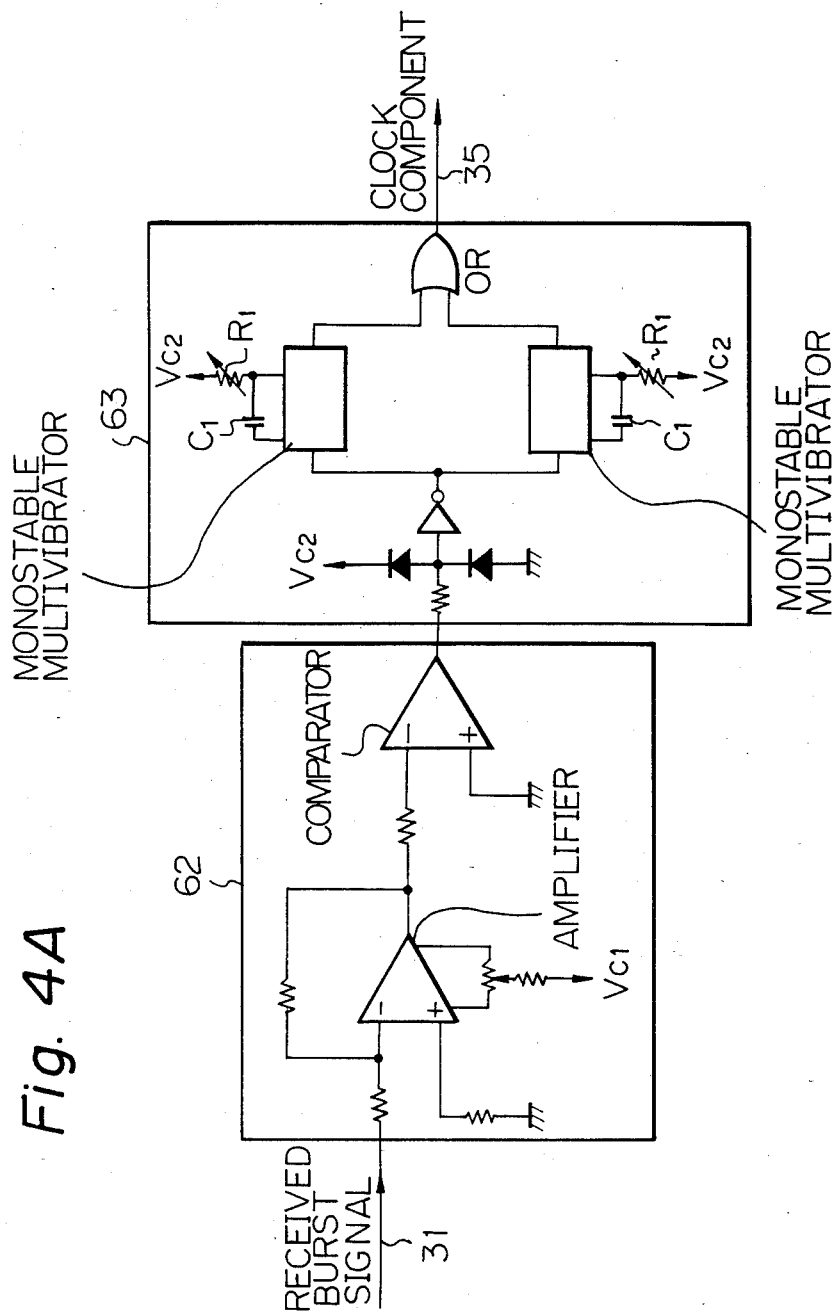
FIGS. 4A and 4B are block diagram of the burst clock recovery circuit 32 in FIG. 3, FIGS. 5A and 5B are block diagram of the phase comparator 36 in FIG. 3.
Figure 4B:
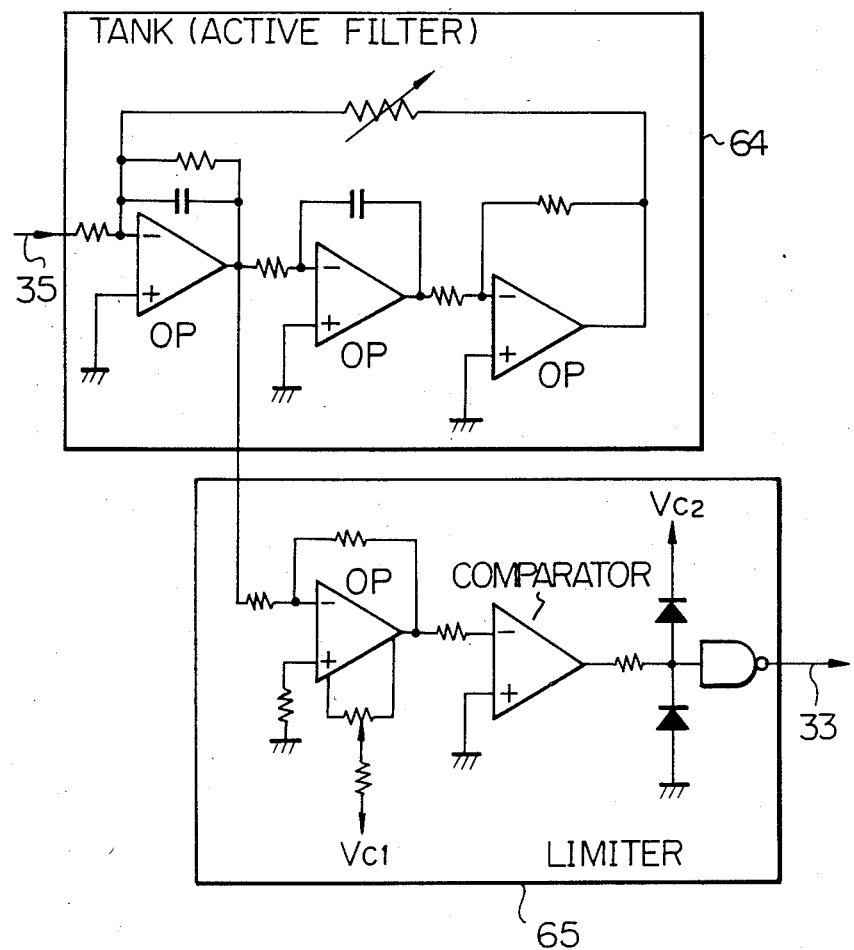

FIG. 4 shows a burst clock recovery circuit 32, in which 31 is the received burst signal, 35 is the clock component, 62 is a level comparator and 63 is a clock component extracting circuit. The received burst signal 31 is a demodulated signal, which is converted to a TTL level signal by the level comparator 62. The clock component extracting circuit 63 provides the clock component by triggering a pair of monostable multivibrators at the rising point and the falling point of said demodulated signal.

33 is the recovered burst clock of the received burst signal 31, 64 is a resonant circuit (tank circuit), and 65 is a limiter. In the preferred embodiment, the clock frequency is 65 KHz, and the center frequency of the tank circuit 64 is 65 KHz, and the Q of the tank circuit 64 is about 54. Accordingly, the improvement of S/N by the tank circuit 64 is about 17.3 dB. In the burst clock recovery circuit 32 the tank circuit 64 provides the clock component with improved S/N (signal to noise ratio), and said clock component is applied to the limiter 65, which converts the waveform to a rectangular form, and the rectangular recovered burst clock 33 for the received burst signal 31 is provided.

Figures 5, 5A:
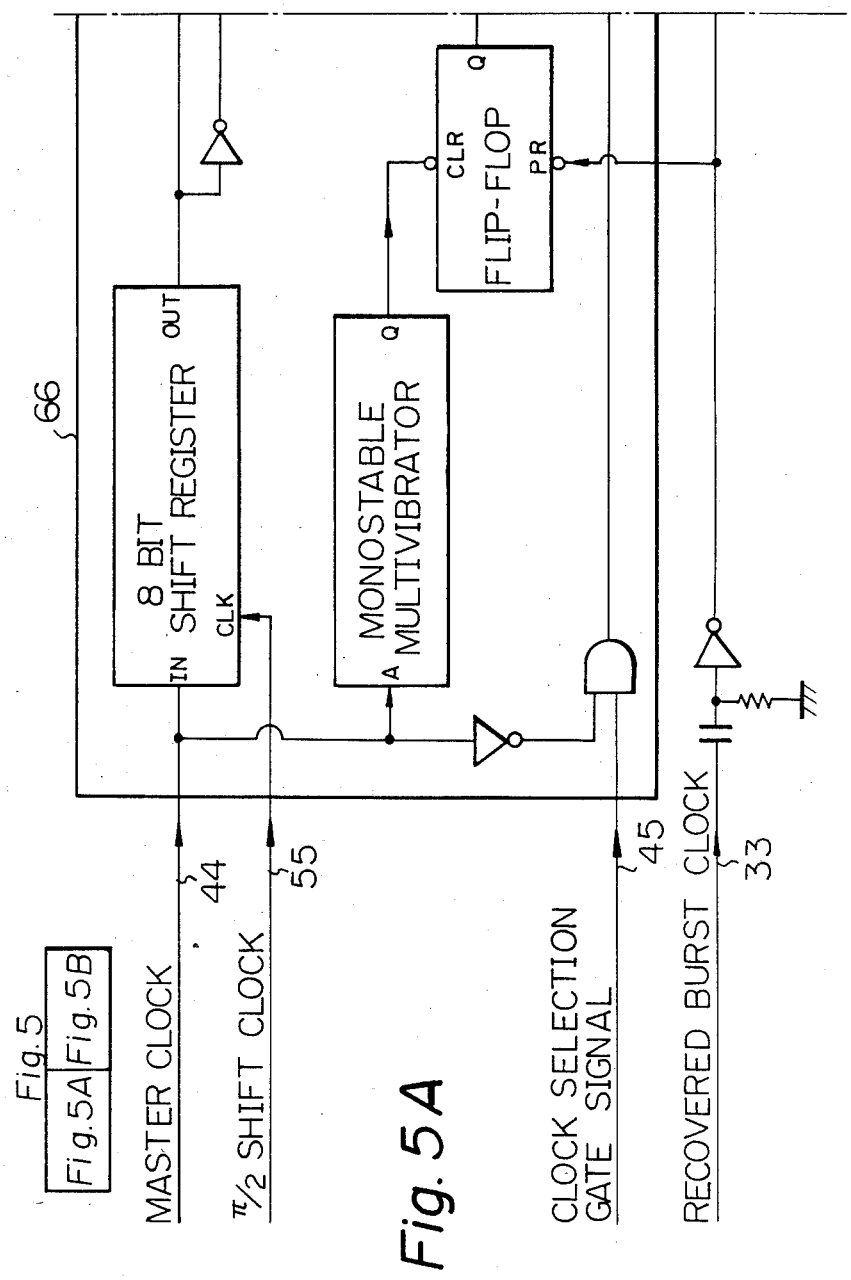
Figure 5B:
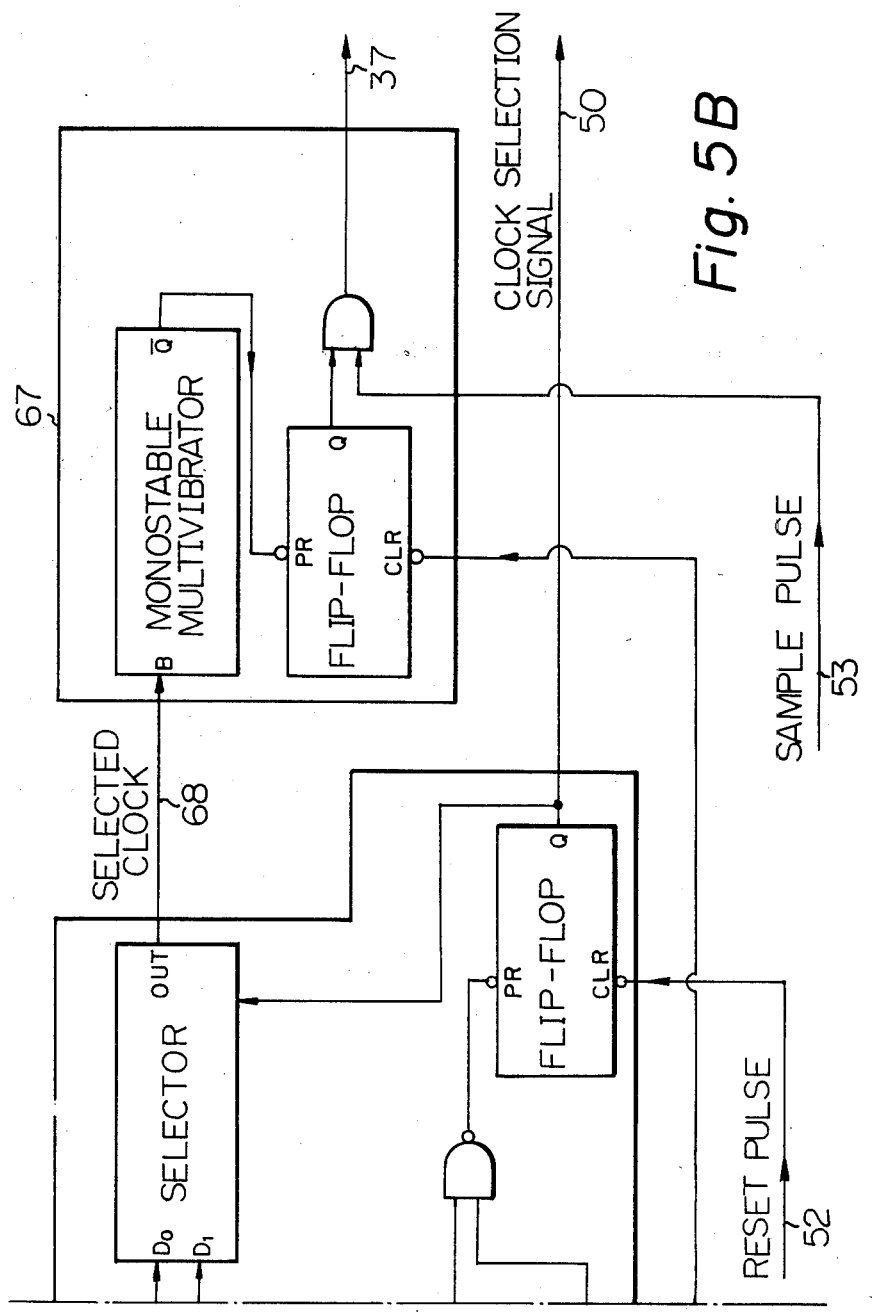

FIG. 5 is a block diagram of the phase comparator 36 of FIG. 3, and FIG. 6 shows the characteristics of the phase comparator 36 of FIG. 6. In FIG. 6, numeral 33 is the burst clock from the burst clock recovery circuit 32, 45 is a clock selection gate signal from the timing generator 43, 44 is a master clock, 55 is a $\pi/2$ shift clock for providing the phase comparison characteristics of FIG. 6, 52 is a reset pulse from the timing generator 43, 53 is a sample pulse for phase comparison, 50 is a clock selection signal applied to the processor 40, 37 is a phase comparison output applied to the counter 38, 66 is a clock selection circuit, 67 is a phase comparison circuit, and 68 is a selected clock. The numerals 69 and 70 in FIG. 6 are phase comparison characteristics of the present phase comparator. The present phase comparator 36 has D type-flip-flop which has a preset terminal and a reset terminal, and compares the recovered burst clock 33 with one of the two clock signals which have $\pm\pi/2$ phase difference from that of the master clock. Then, the average phase is obtained from a plurality of recovered burst clock pulses. When the phase of the recovered burst clock 33 is in area 1 ($0-\pi$), the clock with $-\pi/2$ phase difference derived from the master clock 44 and the curve 69 are used. Then the phase of the recovered burst clock 33 is in area 2 ($\pi-2\pi$), the clock with $+\pi/2$ phase difference derived from the master clock 44 and the curve 70 are used. The clock selection circuit 66 decides whether area 1 or area 2 is used by comparing a pulse of the burst clock 33 with the master clock, and forwards the clock selection signal 50 to the processor 40. Further, the master clock 44 is delayed by $\pi/2$ in the 8 bits shift register by the $\pi/2$ shift clock 55 (2.08 MHz) from the clock generator, a pair of clocks which have $\pm\pi/2$ phase difference from the master clock 44 are obtained by using an inverter, further, the clock selection signal 50 selects one of the clocks with $\pm\pi/2$ phase differences from that of the master clock, and the selected one is applied to the phase comparator 67 as the selected clock 68. The phase comparison circuit 67 gates the sample pulse 53 (16.64 MHz) according to the phase difference between the clock 68 and the burst clock 33, and the gated sample pulse is applied to the counter 38 as the output 37 of the phase comparator 36.

Figure 7:
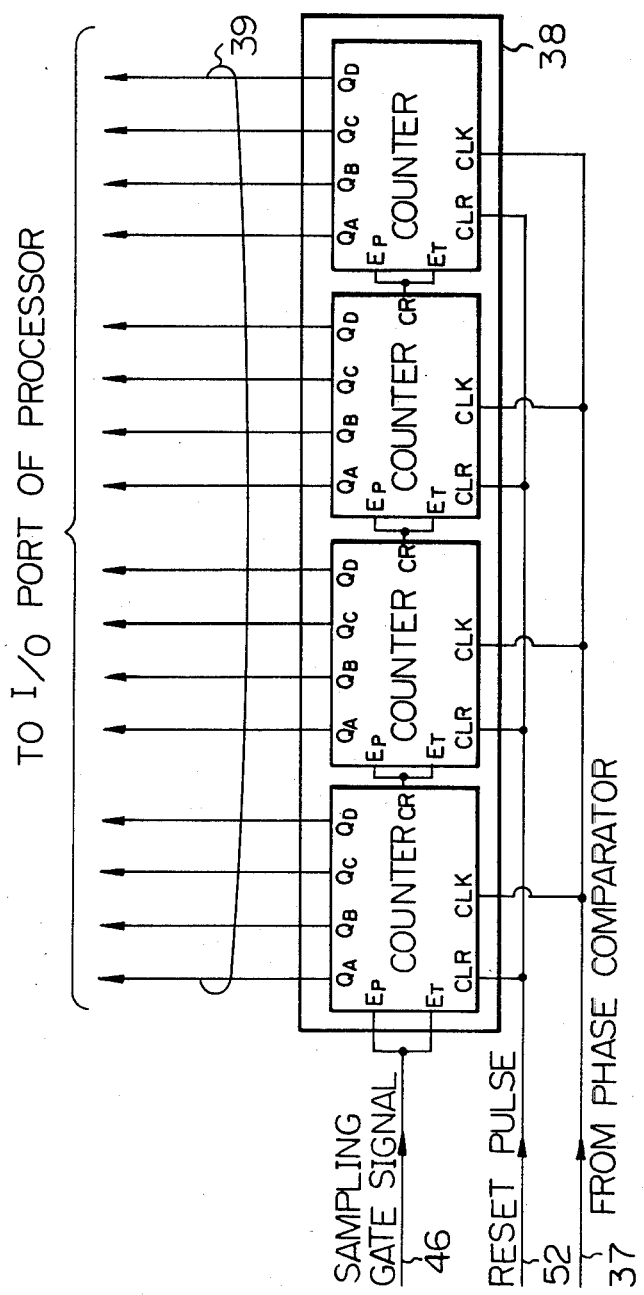
FIG. 7 is a block diagram of the counter 38 in FIG. 3.

FIG. 7 is a block diagram of the counter 38, in which numeral 37 is the output of the phase comparator 36, 39 is the output of the counter 38, 46 is the sampling gate signal from the timing generator 43, and 52 is the reset pulse from the timing generator 43. The counter 38 counts the pulse signals of the output 37 of the phase comparison circuit when the sampling gate signal 46 exists, and the counted value 39 is applied to the I/O port of the processor 40. The output 39 of the counter 38 is reset by the reset signal 52 when the next burst is received.

Figure 8:
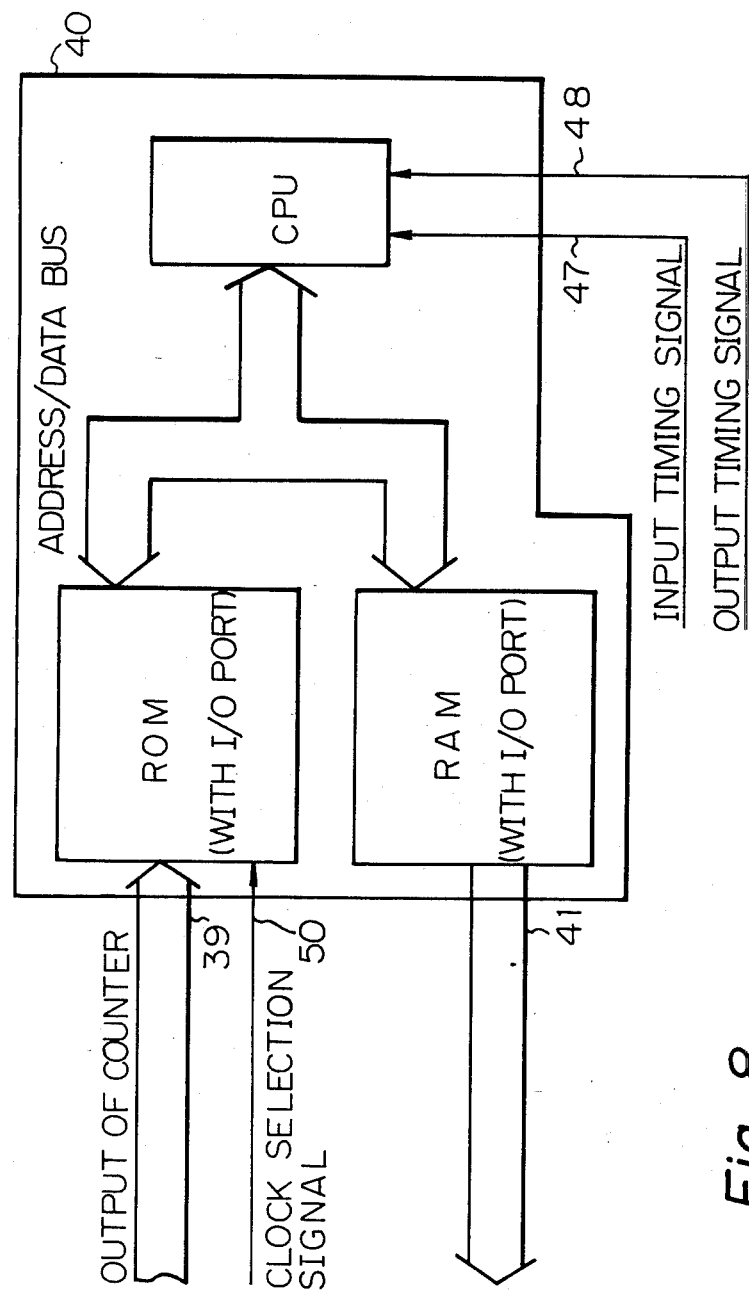
FIG. 8 is a block diagram of the processor 40 in FIG. 3.

FIG. 8 is a block diagram of the processor 40, in which 39 is the output of the counter 38, 50 is the clock selection signal from the phase comparison circuit 36, 41 is the phase difference information of the decision clock with respect to the master clock 44, 47 is the input timing signal for the input of the output signal 39 of the counter 38, amd 48 is the output timing signal for the output of the phase difference information 41 of the decision clock with respect to the master clock 44. The processor 40 is made of 3 chips of CPU, ROM with I/O port, and RAM with I/O port. The processor 40 takes the output 39 of the counter 38 by the input timing signal 47, divides the value of the output 39 by the number of the measured pulses to provide an average for each pulse. Further, it is recognized whether the phase of the recovered burst clock 33 is in area 1 or area 2 by the clock selection signal 50 from the phase comparator 36, and said average for each pulse is given $\pm \pi/2$ phase compensation. The compensated phase is stored in a RAM as the phase difference information A of the recovered burst clock 33 with respect to the master clock 44. Next, the said phase difference information A for the presently received burst signal 31 and a predetermined plurality of the phase difference informations A for burst signals from the same transmitting earth station which precede the presently received burst signal 31 are averaged as the phase difference information B for the next burst signal 31. Said phase difference information B is read out when the next burst signal arrives as the phase difference information 41 of the decision clock 49 with respect to the master clock 44.

Figure 9:
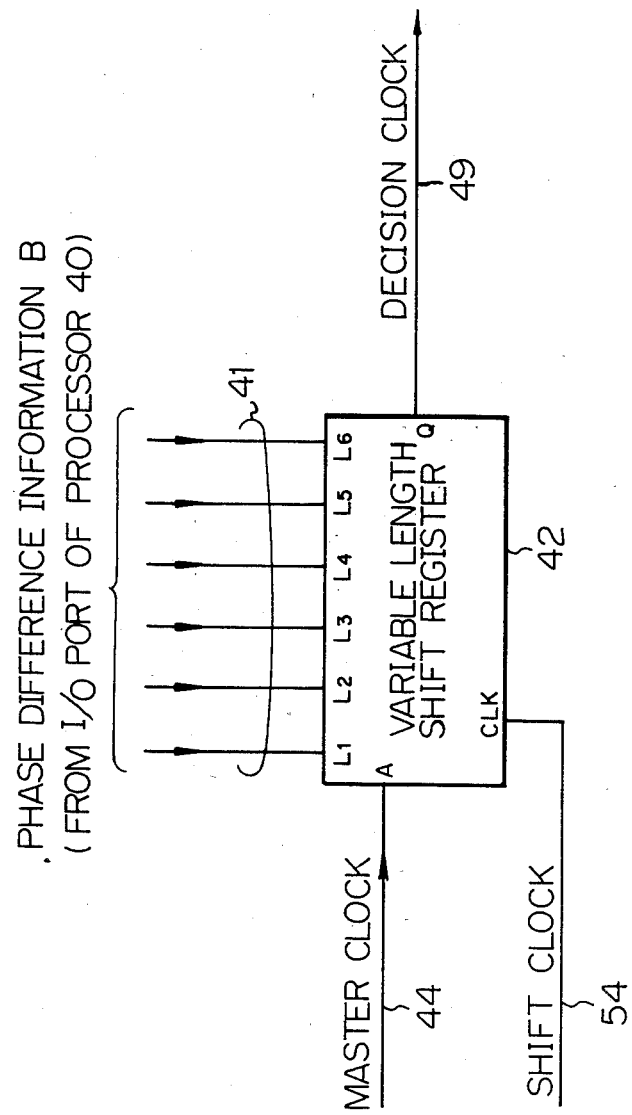
FIG. 9 is a block diagram of the clock shift circuit 42 in FIG. 3.

FIG. 9 is the block diagram of the clock shifter 42, in which numeral 41 is the output signal from the processor 40, 44 is the master clock, 49 is the decision clock, and 54 is a shift clock. The clock shifter 42 is made by using only one variable shift registerchip with maximum register length of 64 bits. The clock shift circuit 42 provides the daly corresponding to the phase difference information 41 from the processor 40 to the master clock 44, and the delayed clock is output as the decision clock 49.

The timing generator 43 in FIG. 3 provides the following signals to the above mentioned circuits using the master clock 44 and the burst pulse 51 which indicates the start of the received burst signal. These signals are the clock selection gate signal 45, the sampling gate signal 46, the input timing signal 47, the output timing signal 48 and the reset pulse 52.

The clock generator 56 in FIG. 3 has a basic clock frequency of 16.64 MHz, which is divided to desired clock frequencies and these clock frequencies are supplied to various circuit portions.

Figure 10:
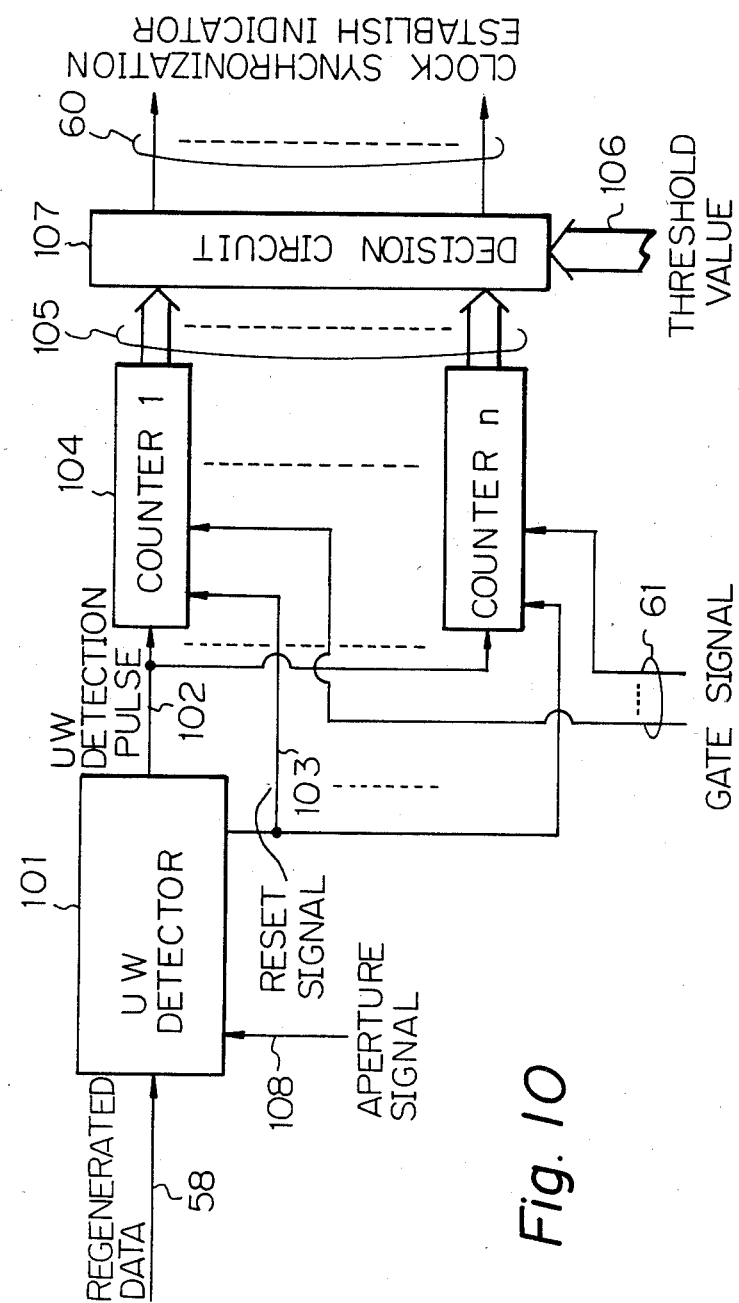
FIG. 10 is a block diagram of the first embodiment of the clock synchronization detection circuit 59 in FIG. 3.

FIG. 10 is a block diagram of the first embodiment of the clock synchronization establishment detection circuit 59 (FIG. 2A and FIG. 3), in which 58 is the regenerated data, 60 is the output signal which indicates the establishment of the clock synchronization, 61 is a gate signal, 101 is an UW (unique word) detection circuit, 102 is an UW detection pulse, 103 is a reset signal, 104 is a counter, 105 is an output signal of the counter 104, 107 is a decision circuit, 106 is an threshold value for the decision circuit 107, and 108 is a aperture signal.

In FIG. 10, the UW detection circuit 101 detects the unipue word (UW) which is included in the received burst signal. The UW detection pulse 102 which indicates the presence of the UW is applied to the counter 104 which counts the number of the UW detection pulses. The UW detection pulse 102 of the output of the UW detector 101 shows the presence of an unique word (UW) transmitted from a plurality of earth stations, which means that a plurality of UW detection pulses from difference earth stations are included in the output pulse 102.

Therefore, UW detection pulse 102 must be sorted according to respectibe earth stations. The gate signal 61 which is supplied from an external circuit, and shows the reception timing of a burst signal of each earth station, separates the UW detection pulses 102 to respective earth stations, and the number of separated UW pulses are counted by the counter 104. When the content of the counter 104 reaches the predetermined number 106, the decision circuit 107 recognizes the establishment of the clock synchronization, and provides the output signal 60. If the UW detection is missed, the counter 104 relating to the earth station which transmitted the missed UW word is reset to zero by the reset signal 103. Accordingly, the establishment of the clock synchronization is determined by continuous detection of the unique word (UW).

Figure 11:
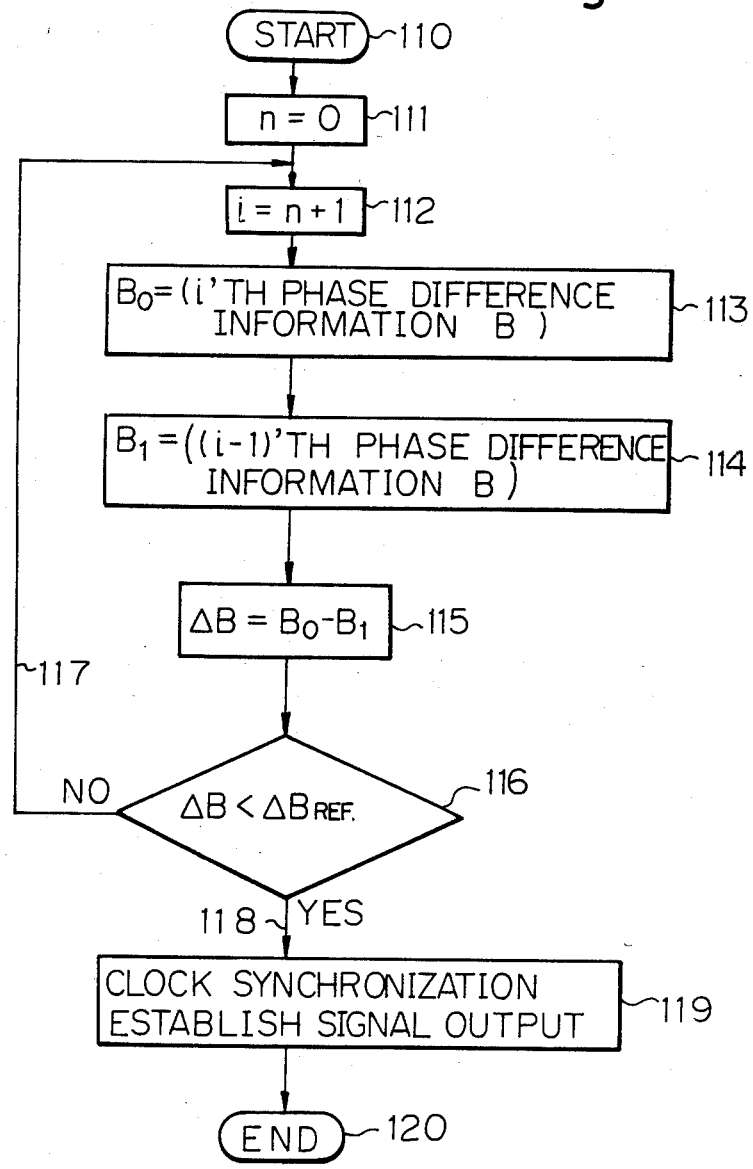
FIG. 11 is the flow chart for the second embodiment of the clock synchronization detection circuit 59 in FIG. 3.

FIG. 11 is a flow chart showing another embodiment of the detection of the clock synchronization. In FIG. 11, numeral 110 shows just the start, 111,112,113,114,115, and 119 show the execution, 116 is the branch, 117 and 118 show path after the branch, and 120 shows the end of the flow chart. The execution of the flow chart FIG. 11 is carried out by a programmed computer in the processor 40 in FIG. 3. It is supposed that the phase difference information B drifts much at first since that information B is merely the accumulation of the phase difference information A. Therefore, as shown in FIG. 11, the i'th phase difference information B is read out in by box 113, and the (i−1)'th phase difference information B is read out in the box 114, and the box 115 provides the difference ΔB between the two phase difference informations. Then, the box 116 compares the difference ΔB with the predetermined fixed value $\Delta B_{ref}$. When $\Delta B_{ref}$ is larger than ΔB, the establishment of the clock synchronization is recognized.

Figure 12:
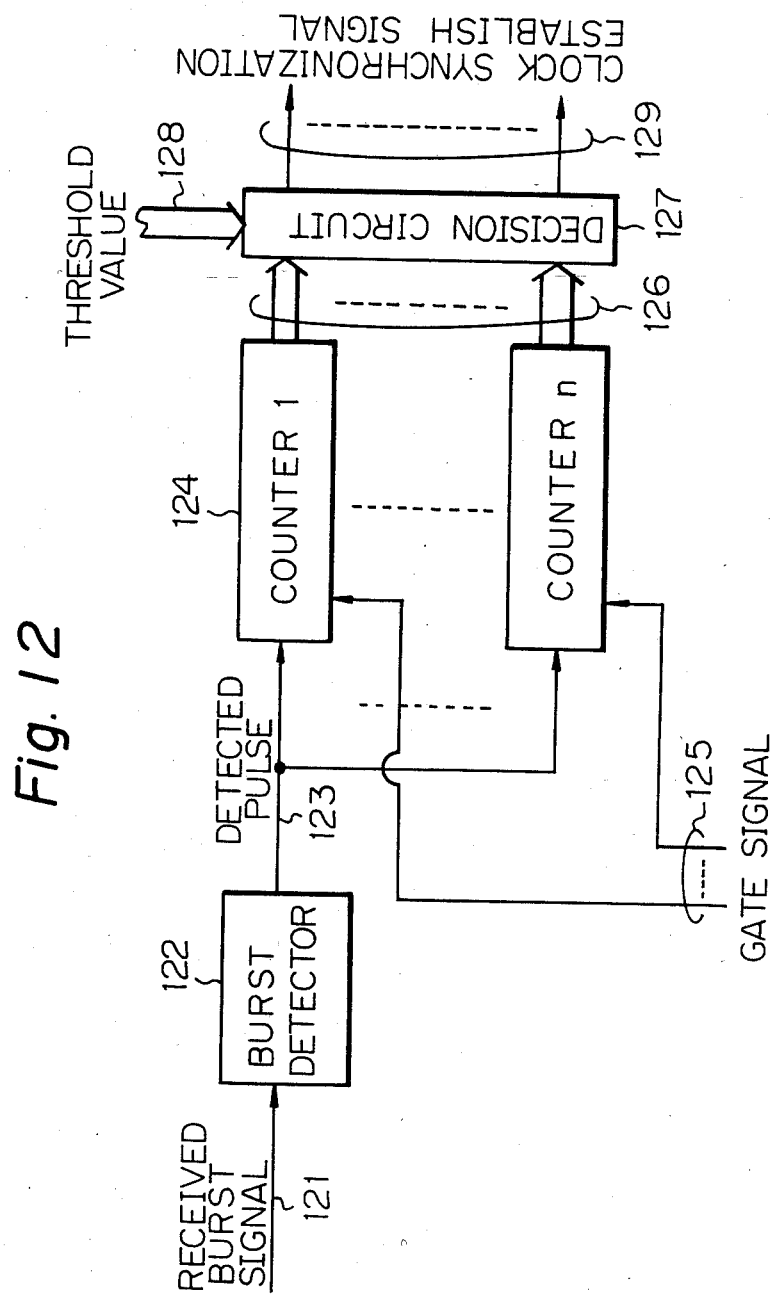
FIG. 12 is a block diagram of the third embodiment of the clock synchronization detection circuit 59 in FIG. 3.

FIG. 12 is still another embodiment of the detection circuit 59 of the clock synchronization establishment detection circuit. The embodiment of FIG. 12 operates on the principle that the number of the phase difference information A is determined at the time of the system design and therefore it is a known value, and therefore, the establishment of the clock synchronization can be recognized by counting the number of the phase difference information A. In FIG. 12, numeral 121 is the received burst signal before demodulation, 122 is the burst signal detector, 123 is the detection pulse of the detector 122, 124 is a counter, 125 is a gate signal to the counter 124, 126 is the output of the counter 124, 127 is the decision circuit, 128 is the threshold value of the decision circuit 127, and 129 is the output signal showing the establishment of the clock synchronization. The burst signal detector 122 recognizes the received burst signal 121 by using an envelope detection system. The circuit 122 performs first envelope detection, and provides the detection pulse 123 when the output level of envelope detection exceeds a predetermined level. The detection pulses 123 include the signals from a plurality of earth stations, therefore, those pulses must be separated to respective earth stations. The gate signal 125 from an external circuit shows the reception timing of a burst signal of respective earth stations, and that gate signal 125 controls the operation of the counter 124 to count the pulses 123 for respective earth stations. The output 126 of the counter 124 relating to each earth station is applied to the decision circuit 127 which provides the establishment output signal 129 when the output 126 coincides with the predetermined threshold value 128.

As described above, according to the present invention, the number of the clock recovery symbols is considerably reduced, or even removed while a prior system must have more than 80 clock recovery symbols. Therefore, the ratio of the available portion of a burst is increased by the present invention.

FIG. 13 shows curves of the burst utilization efficiency. The horizontal axis of FIG. 13 shows the transmission capacity for each burst. It is assumed in FIG. 13 that the frame period is fixed to 50 msec. The curve (a) in FIG. 13 shows the characteristics of a prior art, and the curve (b) shows that of the present invention. As apparent from FIG. 13, the present invention is effective in particular when the transmission capacity is small. Therefore, the present invention is useful in particular for a low speed TDMA communication system.

Since the present invention obtains the phase difference information of the decision clock by taking the moving average of the phase difference of the received bursts, the present invention has the effect of integrating the clock phase difference, and has the effect of substantially boosting the effective Q of the tank circuit in the clock recovery circuit, and reducing the phase jitter. According to the experiment, the C/N value was improved by about 6 dB when the case in which the phase information was obtained by taking the moving average of 8 frames was compared with the case in which the phase information of only the previous single frame was used.

FIG. 14 shows curves between the $E_b/N_O$ (the ratio of the signal power for each bit to the noise power in 1 Hz in dB, horizontal axis), and phase jitter of the recovered clock signal (degree, vertical axis). The curve (a) in FIG. 14 shows the characteristics of the case in which the moving average of 8 frames is used. The curves (b) shows the case in shich the information of only the previous single frame is used. The curves (b) shows the cases in which the information of only the previous single frame is used. In each frame, the average of 32 symbols is taken for each burst. By comparing the curve (a) with the curve (b), it should be noted that there is an improvement of about 6 dB.

From the foregoing, it will now be apparent that a new and improved clock recovery system for a TDMA communication system has been established. It should be understood of course that the embodiments disclosed are merely illustrative and are not intended to limit the scope of the invention. Reference should be made to the appended claims, therefore, rather than the specification as indicating the scope of the invention.

What is claimed is:

1. A clock signal recovery system for TDMA satellite communication system in which a transmitting earth station transmits periodically modulated burst signals which are synchronized with each other in both frequency and phase and a receiving earth station demodulates that burst signal by using the recovered clock signal comprising:

an input terminal for receiving TDMA bust signals;
   a burst clock recovery means to obtain burst clock from the received burst signal;
   a clock control means to generate the recovered clock by controlling a local clock oscillator according to stored frequency and/or phase information and said burst clock,
   a frequency and/or phase memory means for storing frequency and/or phase information of an output of said clock control means for more than two frame periods,
   said frequency and/or phase memory means including a processor means for providing a signal of the average of the frequencies and/or phase information stored in memory,
   a decision circuit for regenerating received burst signal by using the recovered clock signal,
   a first output terminal coupled with output of said decision circuit to provide regenerated burst signal,
   a synchronization detection circuit coupled with said output terminal for indicating establishment of clock synchronization of a clock signal after receiving predetermined pluality of bursts from the same transmitting earth station,
   a second output terminal coupled with output of said synchronization detection circuit.

2. A clock signal recovery system according to claim 1, wherein said clock control means is controlled by output of said frequency and/or phase memory means, and said decision circuit uses the output of said clock control means for regenerating the received bursts.

3. A clock signal recovery system according to claim 1, wherein said decision circuit takes the output of said frequency and/or phase memory means through a shifter for regenerating the received bursts.

4. A clock signal recovery system according to claim 1, wherein said frequency and/or phase memory means provides a moving average of frequency and/or phase informations of more than two preceding bursts.

5. A clock signal recovery system according to claim 1, wherein said frequency and/or phase memory means is implemented by a processor which controls shift means for providing a recovered clock signal, and said shift means shifts a timing signal which is controlled by a received burst signal to provide a synchronized clock signal.

6. A clock signal recovery system according to claim 1, wherein said synchronization detection circuit has a plurality of counters for counting unique word in a frame for every transmitting earth station, and provides synchronization establishment output signal for each transmitting earth station when predetermined number of unique words are received.

* * * * *